(No Model.)

W. S. WITHERS.
Tea Kettle.

No. 229,512. Patented June 29, 1880.

Witnesses:

Inventor:

UNITED STATES PATENT OFFICE.

WALTER S. WITHERS, OF ATLANTA, GEORGIA.

TEA-KETTLE.

SPECIFICATION forming part of Letters Patent No. 229,512, dated June 29, 1880.

Application filed April 14, 1880. (No model.)

*To all whom it may concern:*

Be it known that I, WALTER S. WITHERS, a citizen of the United States, residing at Atlanta, in the county of Fulton and State of Georgia, have invented certain new and useful Improvements in Tea-Kettles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in household implements commonly known as "tea-kettles," and other similar vessels which are provided with movable covers.

It consists of so connecting the bail or handle with the lid or cover of the kettle that when the lid is closed upon the kettle the handle will be held erect, or, if the bail be depressed to the side, the lid, which is hinged to the kettle at that side, will be raised accordingly, and when the handle is grasped to raise the kettle the lid is prevented from moving either vertically or laterally.

The object of my invention is to provide a means for preventing the possibility of the handle of the kettle becoming heated, as is the common occurrence with ordinary utensils of this class when placed over the fire in a stove, and consequently render it unsafe to be grasped by the unprotected hand, and also to prevent the lid, through the medium of the same arrangement, from raising or moving from off the kettle, holding it firmly pressed down when it is tipped or inclined, thus avoiding the accidents incident to the falling, sliding, or raising of the lid, which gives a vent for the escapement of hot water and steam at an unexpected point and with unpleasant results.

In order to enable others skilled in the art to which my invention appertains to make and use the same, I will now proceed to describe its construction and operation, referring to the annexed drawings, which form a part of this specification, and in which—

Figure 1:
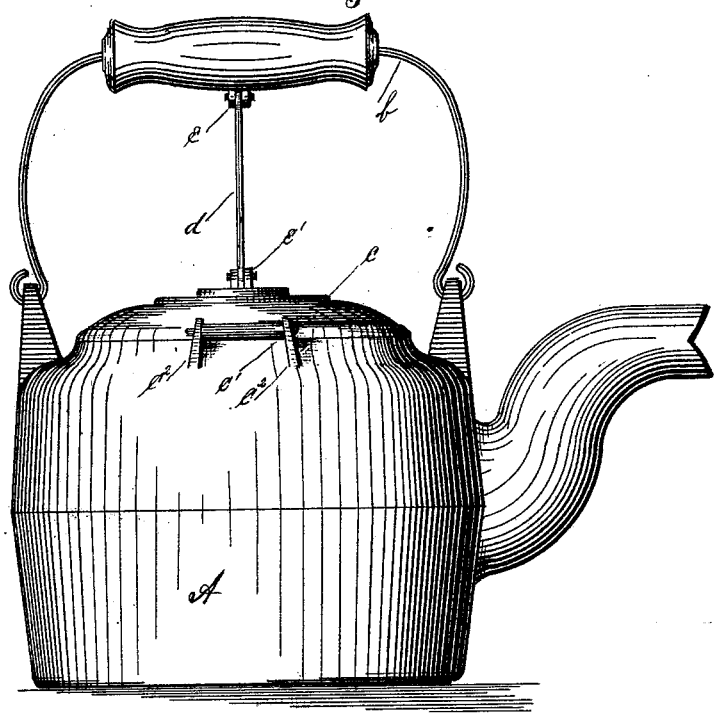
Figure 2:
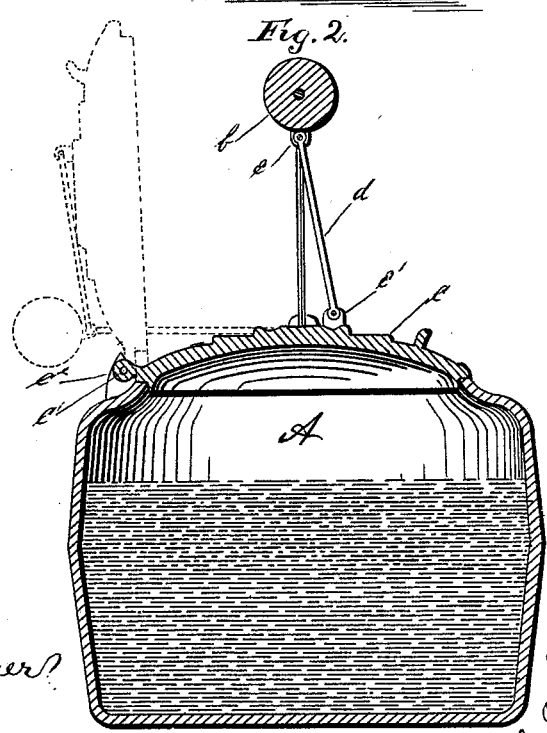

Figure 1 is a side elevation of an ordinary tea-kettle having my improvements attached. Fig. 2 is a cross-sectional view of the same.

A represents the body of an ordinary tea-kettle, formed in the usual manner, having the bail or handle $b$ attached to it in the common way for that purpose.

A lid, $c$, serves as a cover for the orifice in the top of the kettle, to the body A of which it is hinged at $c'$ between the lugs $c^2$. The bail $b$ is connected with the lid $c$ by a rod, $d$, which is of such a length that when the lid $c$ rests on the edge of the orifice in the top of the kettle, which it covers closely, the bail $b$ will be held erect, as shown in the drawings. This rod $d$ is pivoted to the bail, at about its middle, within the slotted lug $e$, and to the lid $c$ within the slotted lug $e'$. The lug $e'$ is suitably attached to or formed on the lid $c$ at a point beyond its center, and at a requisite distance from where it is hinged to the body A of the kettle, thus causing the rod $c$ to stand at an angle to the line of the bail $b$ when erect, as shown at Fig. 2 of the drawings.

It is manifest that when the lid $c$ is closed over the opening in the kettle, which it covers, the handle must necessarily be held erect, and when the said handle or bail is grasped and the kettle raised, that by reason of the peculiar location of the lug $e'$ the hinged lid will be held firmly against the body of the kettle over the orifice in its top, and thus stop the escapement of steam or water, as the lid cannot possibly raise or slip to the side, even though the kettle be turned half over in the direction of its spout.

It is also obvious that the lid $c$ may be raised wholly or partially from off the kettle by depressing the handle $b$, as represented by the broken line in Fig. 2, which dispenses with the trouble and inconvenience of taking hold of the lid for that purpose, as is the case with the ordinary class of vessels of like character; and it will be readily understood a great advantage of my improvement is, that the handle, not being permitted at any time to be in contact with the side of the kettle, cannot become heated, which is a cause of much inconvenience in the old style of kettle.

Having thus described my invention, what I wish it to be understood that I claim as new, and desire to secure by Letters Patent, is—

The combination of body A of a tea-kettle, with lid $c$ hinged thereto, rod $d$, pivoted to and connecting the said lid $c$ and bail $b$, in the manner shown and described, and for the purpose set forth.

In testimony whereof I affix my signature in presence of two witnesses.

W. S. WITHERS.

Witnesses:
J. C. McMILLAN,
A. FRISBY SANNER.